(12) United States Patent
Kim

(10) Patent No.: US 7,158,343 B2
(45) Date of Patent: Jan. 2, 2007

(54) DISK CLAMP OF HARD DISK DRIVE TO PREVENT SLIPPAGE OF DISK AND DAMAGE TO SPINDLE MOTOR

(75) Inventor: Do-wan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 162 days.

(21) Appl. No.: 10/358,890

(22) Filed: Feb. 6, 2003

(65) Prior Publication Data

US 2003/0156354 A1  Aug. 21, 2003

(30) Foreign Application Priority Data

Feb. 15, 2002  (KR) .................. 2002-8117

(51) Int. Cl.
*G11B 17/02*  (2006.01)
(52) U.S. Cl. .................. 360/99.12; 360/98.08
(58) Field of Classification Search ............ 360/98.08, 360/99.12
See application file for complete search history.

(56) References Cited

U.S. PATENT DOCUMENTS

| 5,243,481 A | * | 9/1993 | Dunckley et al. ......... 360/99.08 |
| 5,422,768 A | * | 6/1995 | Roehling et al. ......... 360/98.08 |
| 5,528,434 A |   | 6/1996 | Bronshvatch et al. .... 360/98.08 |
| 5,659,443 A | * | 8/1997 | Berberich ................ 360/98.06 |
| 5,761,002 A | * | 6/1998 | Moir et al. .............. 360/98.08 |
| 5,781,374 A | * | 7/1998 | Moir et al. .............. 360/99.12 |
| 5,790,346 A | * | 8/1998 | Fletcher .................. 360/99.12 |
| 5,822,151 A | * | 10/1998 | Albrecht et al. ......... 360/98.08 |
| 5,880,905 A | * | 3/1999 | Kazmierczak et al. ... 360/98.08 |

(Continued)

FOREIGN PATENT DOCUMENTS

JP       6-318355       11/1994

(Continued)

OTHER PUBLICATIONS

Notice to Submit Response (from Korean Patent Office), dated Feb. 26, 2004.

(Continued)

*Primary Examiner*—Jefferson Evans
(74) *Attorney, Agent, or Firm*—Staas & Halsey LLP (57) ABSTRACT

A disk clamp of a hard disk drive installs a disk firmly for storing data using a spindle motor of the hard disk drive. The disk clamp includes a vertical pressing portion, formed along an edge portion of the disk, for pressing an upper surface of the disk in a vertical direction, a plurality of horizontal pressing portions, formed inside the vertical pressing portion to protrude downward and be inserted between an outer circumference of the spindle motor and an inner circumference of the disk, to press an inner circumferential surface of the disk outwardly, and a plurality of screw coupling holes formed inside the horizontal pressing portion, through which screws are inserted to be coupled to an upper end portion of the spindle motor. The horizontal pressing portions are formed in at least three positions in a circumferential direction at regular intervals or at four positions at an interval of approximately 90° in the circumferential direction. Thus, when an external impact is applied to the hard disk drive, a slip of the disk is not generated, and the spindle motor is prevented from being damaged.

17 Claims, 4 Drawing Sheets

U.S. PATENT DOCUMENTS

| | | | |
|---|---|---|---|
| 6,028,739 A * | 2/2000 | Lindrose | 360/99.12 |
| 6,055,123 A * | 4/2000 | Kazmierczak et al. | 360/98.08 |
| 6,462,903 B1 * | 10/2002 | Yamada et al. | 360/99.12 |
| 6,483,661 B1 * | 11/2002 | Martin et al. | 360/99.12 |
| 6,567,238 B1 * | 5/2003 | Renken et al. | 360/99.12 |

FOREIGN PATENT DOCUMENTS

| | | | |
|---|---|---|---|
| JP | 06-318355 A | * | 11/1994 |

OTHER PUBLICATIONS

"Rigid Disk Clamping System for Magnetic Disks," IBM Technical Disclosure Bulletin, vol. 32, No. 6A, Nov. 1999, pp. 476-477.

European Search Report issued Jul. 21, 2006 in European Patent Application No. 03003455.7.

* cited by examiner

DISK CLAMP OF HARD DISK DRIVE TO PREVENT SLIPPAGE OF DISK AND DAMAGE TO SPINDLE MOTOR

CROSS-REFERENCE TO RELATED APPLICATIONS

This application claims the benefit of Korean Application No. 2002-8117, filed Feb. 15, 2002, in the Korean Intellectual Property Office, the disclosure of which is incorporated herein by reference.

BACKGROUND OF THE INVENTION

1. Field of the Invention

The present invention relates to a hard disk drive, and more particularly, to a disk clamp of a hard disk drive having an improved structure to prevent a slip of a disk and damage of a spindle motor from an external impact.

2. Description of the Related Art

A hard disk drive (HDD) is one of the auxiliary memory devices of a computer, which reads out data stored in a magnetic disk or records data on the magnetic disk by using a magnetic head.

Figure 1:
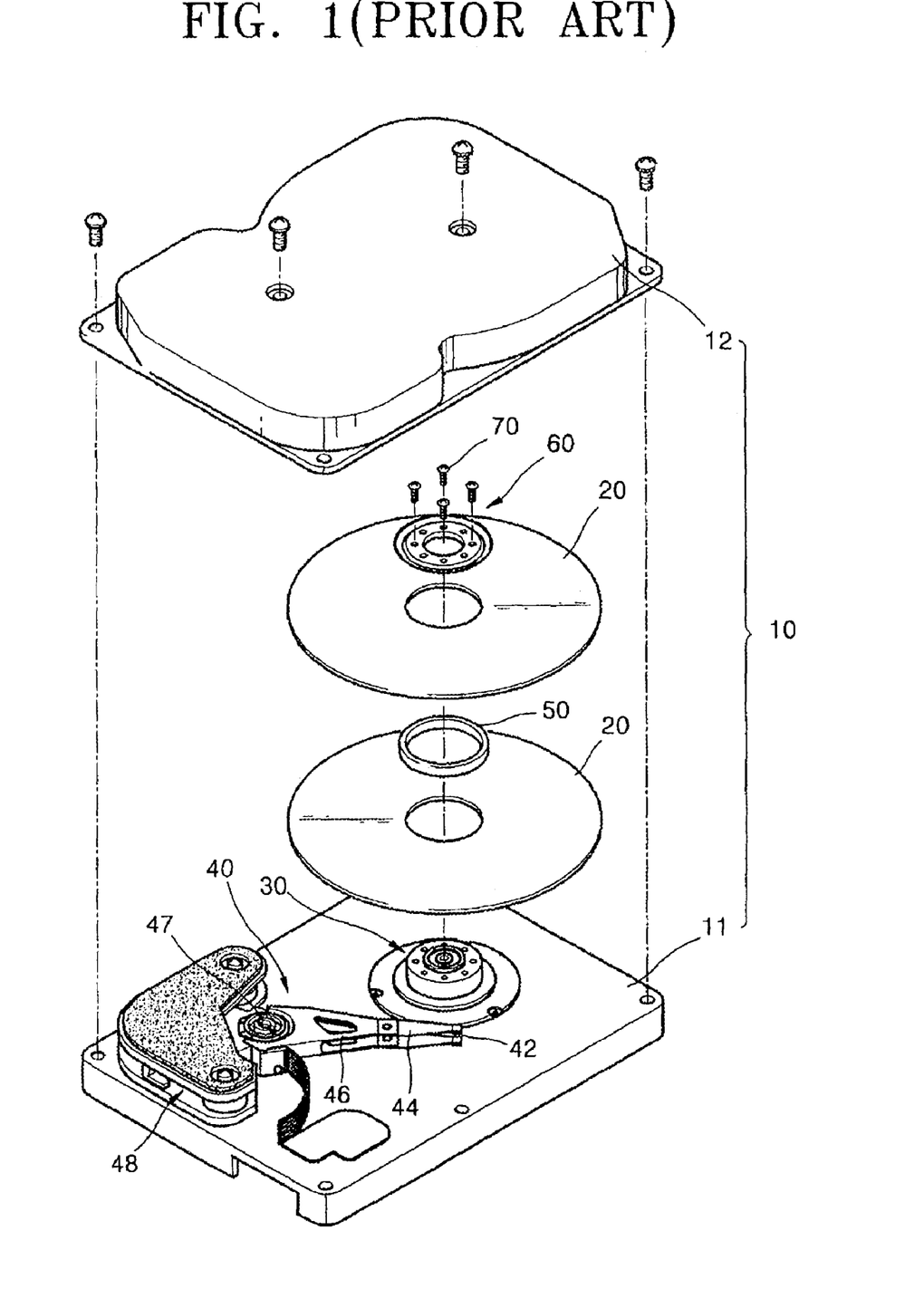
FIG. 1 is an exploded perspective view of a conventional hard disk drive.
Figure 2:
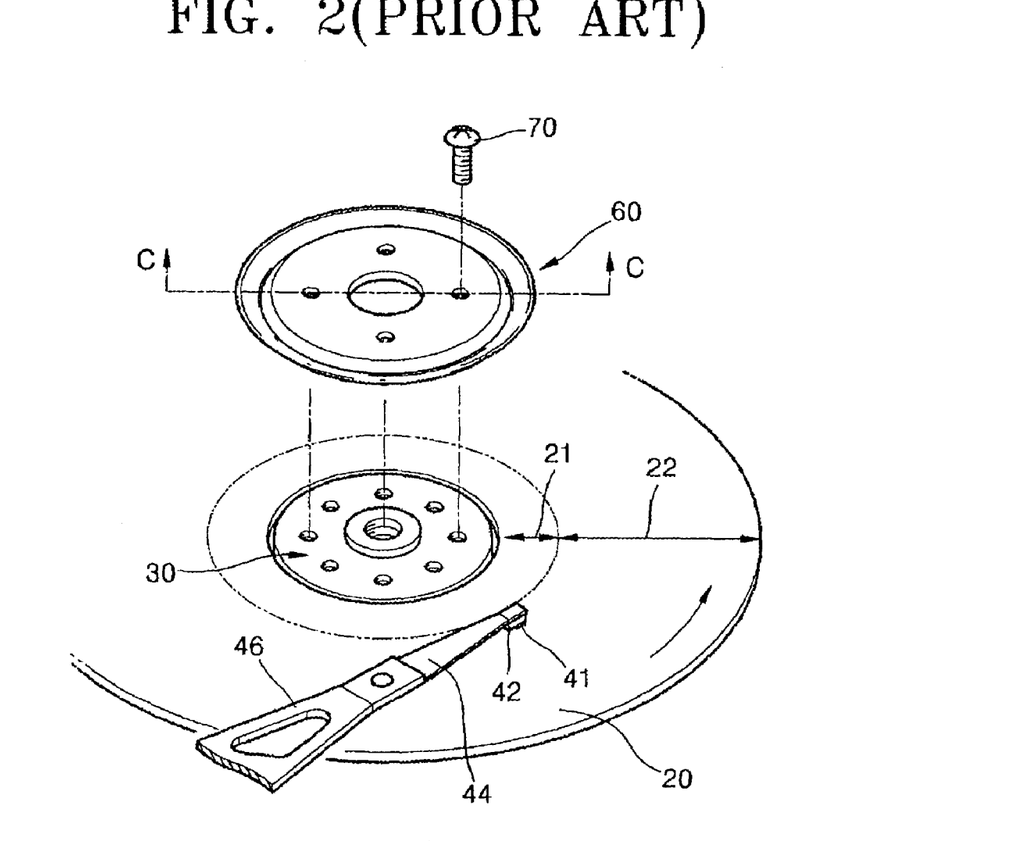
FIG. 2 is an enlarged perspective view of a disk clamp portion of the hard disk drive of FIG. 1.
Figure 3:
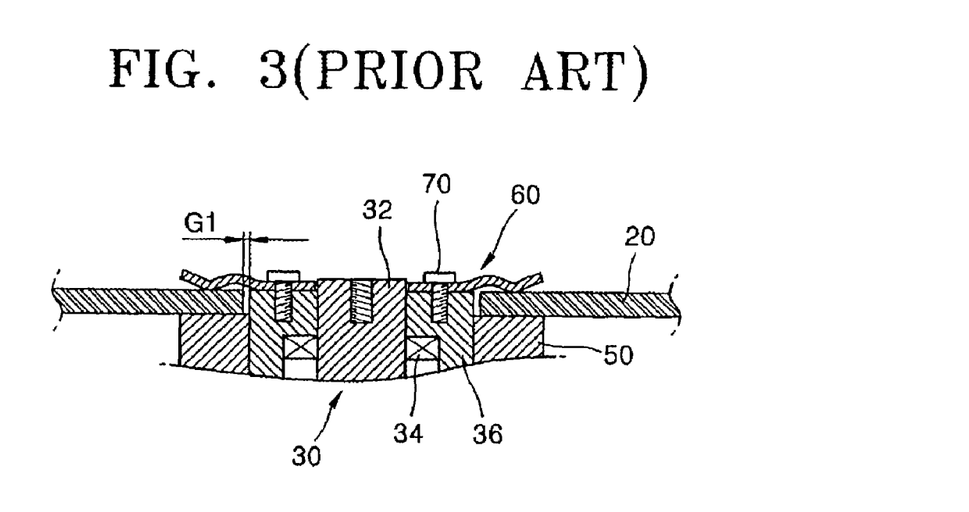
FIG. 3 is a sectional view taken along line C—C of FIG. 2, which shows a state in which the disk clamp of FIG. 2 is coupled to the spindle motor.

FIG. 1 is an exploded perspective view of a conventional hard disk drive. FIG. 2 is an enlarged perspective view of a disk clamp portion of the hard disk drive of FIG. 1. FIG. 3 is a sectional view taken along line C—C, which shows a state in which the disk clamp of FIG. 2 is coupled to the spindle motor.

Referring to FIGS. 1 and 2, a hard disk drive includes a housing 10, a spindle motor 30 installed in the housing 10 to rotate a magnetic disk (a hard disk) 20, and an actuator 40 having a magnetic head 41 for recording and reproducing data on and from the disk 20.

The housing 10 is installed inside a main body of a computer and includes a base plate 11 for supporting the spindle motor 30, the actuator 40 and a cover plate 12 coupled to the base plate 11 for protecting the disk 20 by enclosing the disk 20. The housing 10 is typically manufactured using a stainless steel or aluminum material. The spindle motor 30 is installed on the base plate 11 to rotate the disk 20.

The disk 20 is a recording medium for recording data. A single or plurality of magnetic disks are installed, being separated a predetermined distance from each other and rotatable by the spindle motor 30. A parking zone 21 is located at the inner circumferential side of the disk 20 so that a slider 42, on which the magnetic head 41 is mounted, is accommodated in the parking zone 21 when the power is turned off. A data zone 22, where magnetic signals are recorded, is provided outside the parking zone 21. When a plurality of disks 20 are installed at the spindle motor 30, a ring type spacer 50 is inserted between the disks 20 to maintain a gap between the disks 20. A magnetic disk clamp 60 is coupled to the upper end portion of the spindle motor 30 by a plurality of screws 70 to firmly fix the disk 20 to the spindle motor 30.

The actuator 40 is installed to pivot by a voice coil motor 48 around a pivot shaft 47, installed on the base plate 10. The actuator 40 includes an arm 46, coupled to the pivot shaft 47, to pivot and a suspension 44, installed at the arm 46, to support the slider 42 on which the magnetic head 41 is mounted, and to be biased elastically toward the surface of the disk 20.

In the conventional hard magnetic disk drive having the above structure, when the power is turned off, the slider 42 is accommodated in the parking zone 21 of the disk 20 by an elastic force of the suspension 44. When the disk 20 begins to rotate as the power is turned on, lift by air pressure is generated, and the slider 42 is lifted. The slider 42 in a lifted state is moved to the data zone 22 of the disk 20 as the arm 46 of the actuator 40 pivots. When the slider 42 is moved to the data zone 22 of the disk 20 and maintains a lifted state at a height at which the lift by the rotation of the disk 20 and the elastic force by the suspension 44 are balanced, the magnetic head 41 mounted on the slider 42 maintains a predetermined gap from the disk 20 that is rotating and records and reproduces data on and from the disk 20.

Next, referring to FIGS. 2 and 3, the structure of coupling the spindle motor 30, the magnetic disk 20, and the disk clamp 60 is described in detail. Typically, a shaft 32 of the spindle motor 30 is fixedly installed, and a hub 36 is rotatably installed at the shaft 32 by a bearing 34 at the outer circumference of the shaft 32. The disk 20 is inserted at the outer circumference of the hub 36. When a plurality of the disks 20 are installed, the ring type spacer 50 for maintaining a gap between the disks 20 is inserted around the outer circumference of the hub 36. The disk clamp 60 is coupled to the upper end portion of the hub 36 by the screws 70.

The edge portion of the conventional disk clamp 60 is bent as shown in FIG. 3 to press the upper surface of the disk 20. However, a structure to prevent a horizontal movement of the disk 20 is not provided. To insert the disk 20 around the outer circumference of the spindle motor 30, a relatively small gap $G_1$ is present between the inner circumferential surface of the disk 20 and the outer circumferential surface of the spindle motor 30. Accordingly, when an impact is applied from the outside of the hard disk drive, in particular, from the side surface thereof, a horizontal movement of the disk 20, that is, a slip, is easily generated. When a slip of the disk 20 is generated, the magnetic head 41 cannot accurately read the data recorded on the surface of the disk 20.

Also, when a slip of the disk 20 is generated, the inner circumferential surface of the disk 20 collides against the outer circumferential surface of the spindle motor 30 so that an outside impact is delivered to the spindle motor 30 via the disk 20. Accordingly, the spindle motor 30, in particular, the bearing 34, can be damaged, causing disk fluttering and an increase in noise. In the meantime, the thickness of the disk 20 gradually increases to reduce the disk fluttering. As the disk 20 becomes thicker, the weight of the disk 20 increases, so that inertia increases when the disk 20 slips due to the outside impact. Accordingly, the force of an impact applied to the spindle motor 30 increases so that the spindle motor 30 and the bearing 34 are easily damaged.

SUMMARY OF THE INVENTION

To solve the above-described problems, it is an aspect of the present invention to provide a disk clamp of a hard disk drive having an improved structure so that a slip of the magnetic disk and damage of the spindle motor from the external impact can be prevented.

Additional aspects and advantages of the invention will be set forth in part in the description which follows and, in part, will be obvious from the description, or may be learned by practice of the invention.

To achieve the above and/or other aspects, the present invention includes a disk clamp of a hard disk drive to install, firmly, a magnetic disk storing data at a spindle motor of the hard disk drive, the disk clamp comprising a vertical pressing portion, formed along an edge portion of the magnetic disk, to press an upper surface of the magnetic disk in a vertical direction, a plurality of horizontal pressing portions, formed inside the vertical pressing portion to protrude downward and be inserted between an outer circumference of the spindle motor and an inner circumference of the magnetic disk, to press an inner circumferential surface of the magnetic disk outwardly, and a plurality of screw coupling holes formed inside the horizontal pressing portion, through which screws are inserted to be coupled to an upper end portion of the spindle motor.

According to an aspect, the disk clamp has a dome shape in which a center portion of the disk clamp bulges upward, and when being coupled to the spindle motor by the screw, the disk clamp is deformed to a flat shape.

According to an aspect, the horizontal pressing portion presses the inner circumferential surface of the magnetic disk due to the deformation of the disk clamp.

According to an aspect, the horizontal pressing portions are formed in at least three positions in a circumferential direction at regular intervals.

According to an aspect, the horizontal pressing portions are formed at four positions at an interval of approximately 90° in the circumferential direction.

According to an aspect, the same numbers of the horizontal pressing portions and the screw coupling holes are provided, the horizontal pressing portions and the screw coupling holes each are formed at regular intervals in the circumferential direction and are arranged alternately.

According to an aspect, the vertical pressing portion has a section bulging downward and formed over the edge portion of the disk clamp.

According to an aspect, the disk clamp comprises a metal material having a predetermined elasticity.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout.

The embodiments are described below in order to explain the present invention by referring to the figures.

Figure 4:
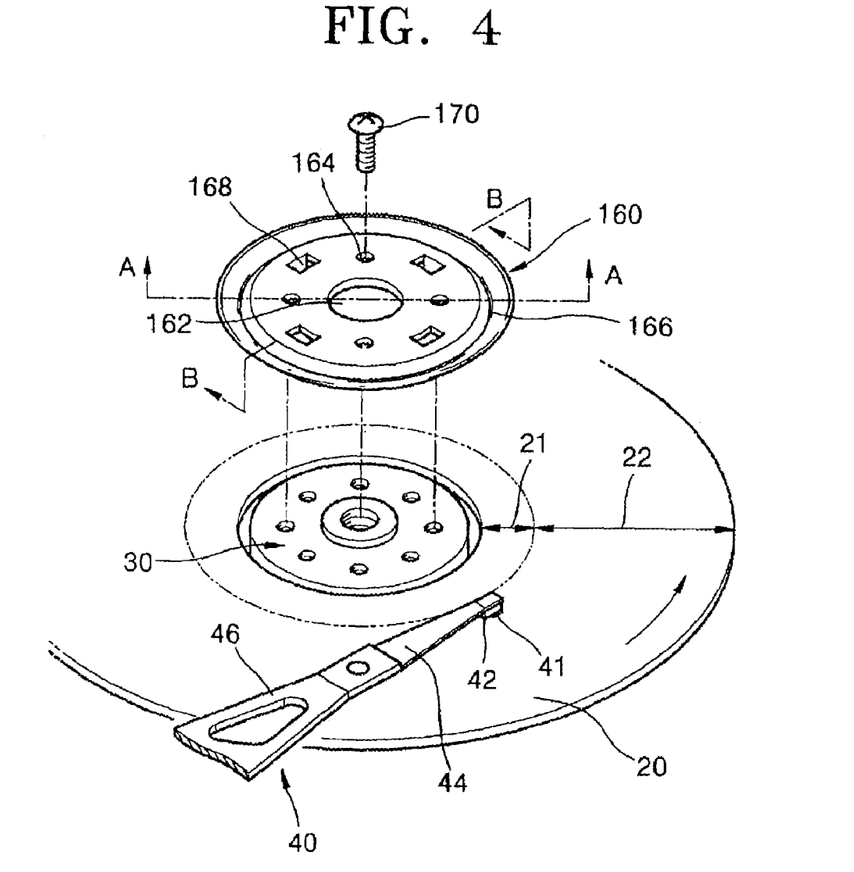
FIG. 4 is an exploded perspective view showing a disk clamp portion of a hard disk drive according to an embodiment of the present invention.
Figure 5:
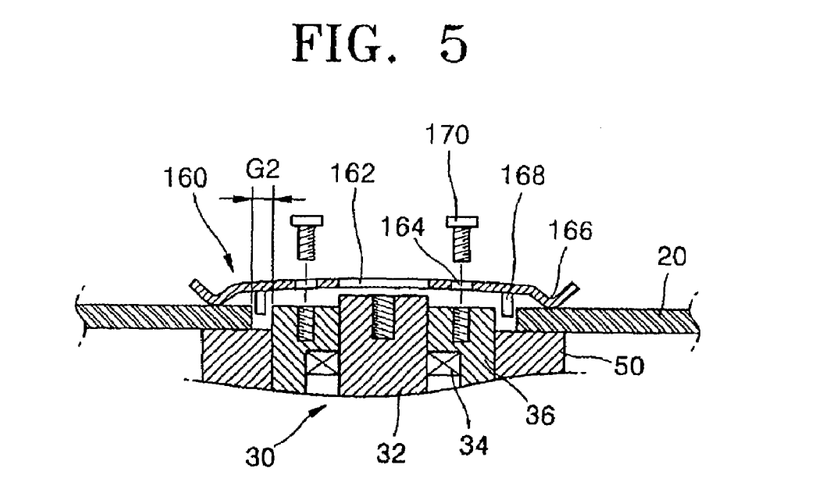
FIGS. 5 and 6 are sectional views of the disk clamp portion taken along line A—A and line B—B of FIG. 4, respectively, which show a state before the screws are coupled to the spindle motor.
Figure 6:
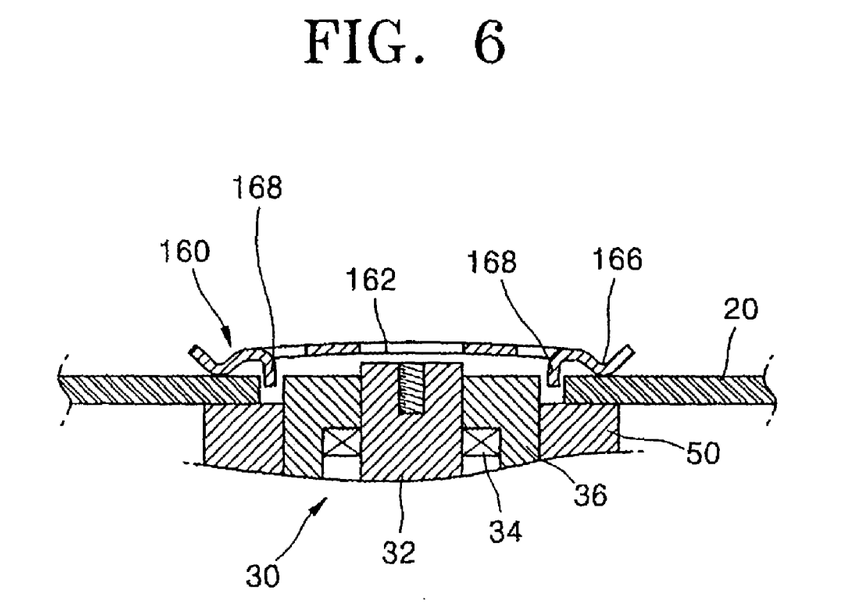

A disk clamp of a hard disk drive according to an embodiment of the present invention is described in detail with reference to the accompanying drawings. Here, the same reference numerals in the drawings indicate the same elements having the same functions. Referring to 4 through 6, a hard disk drive according to an embodiment of the present invention typically includes at least one disk 20, a spindle motor 30 for rotating the disk 20, and an actuator 40 having a magnetic head 41 for recording and reproducing data on and from the magnetic disk 20. Typically, a shaft 32 of the spindle motor 30 is fixedly installed. A hub 36 is rotatably installed at the outer circumference of the shaft 32 by interposing a bearing 34 therebetween. The disk 20 is inserted around the outer circumference of the hub 36. When a plurality of disks 20 are installed, a ring type spacer 50 for maintaining a gap between the disks 20 is inserted around the outer circumference of the hub 36. The parking zone 21 is located at the inner circumferential side of the disk 20 so that the slider 42 having the magnetic head 41 mounted thereon is accommodated in the parking zone 21 when the power is turned off. The data zone 22, where data is stored, is provided outside the parking zone 21. The actuator 40 includes the arm 46 installed in the hard disk drive to pivot and the suspension 44 installed at the arm 46 for supporting the slider 42, where the magnetic head 41 is mounted to be biased elastically toward the surface of the disk 20. Since the slider 42 is lifted due to lift generated by the rotation of the disk 20 to a predetermined height from the disk 20, the magnetic head 41 mounted on the slider 42 records and reproduces data on and from the disk 20 while maintaining a predetermined gap with the disk 20 that is rotating.

In the hard disk drive having the above structure, a disk clamp 160 according to the present invention is used to install, firmly, the magnetic disk (the hard disk) 20 that is a recording medium for recording data using the spindle motor 30 of the hard disk drive. A through hole 162 for inserting the shaft 32 of the spindle motor 30 is formed at the center of the disk clamp 160. A vertical pressing portion 166, for pressing the upper surface of the disk 20, is formed along the edge side of the disk 20. A plurality of horizontal pressing portions 168 are formed at the inner portion of the vertical pressing portion 166 of the disk clamp 160 to protrude downward and be inserted between the outer circumference of the spindle motor 30, that is, the outer circumference of the hub 36, and the inner circumference of the disk 20 to press the inner circumferential surface of the disk 20 toward the outside in a horizontal direction. Also, a plurality of screw coupling holes 164, through which the screws 170 are coupled to the upper end portion of the spindle motor 30, are formed at the inner side of the horizontal pressing portions 168, that is, around the through hole 162.

The vertical pressing portion 166 has a section bulging downward and is formed along the outer circumferential portion of the disk clamp 160. The screw coupling holes 164 are formed in the circumferential direction of the disk clamp 160, for example, at four positions at regular intervals.

The horizontal pressing portions 168 can be formed in at least three positions along the circumferential direction of the disk clamp 160 at regular intervals, preferably, at four positions in the circumferential direction at intervals of approximately 90°, like the screw coupling holes 164. The horizontal pressing portions 168 are inserted between the outer circumference of the hub 36 of the spindle motor 30 and the inner circumference of the disk 20. Thus, the gap $G_2$ between the outer circumference of the hub 36 of the spindle motor 30 and the inner circumference of the disk 20 is, for example, about 1 mm, which is greater than a gap of the conventional technology.

Preferably, the numbers of the screw coupling holes 164 and the horizontal pressing portions 168 are the same and are arranged alternately to distribute the coupling force applied to the disk clamp 160 by the screws 170 and the pressing force applied to the inner circumferential surface of the disk 20 by the horizontal pressing portions 168 in a relatively uniform manner. Also, if the screw coupling holes 164 and the horizontal pressing portions 168 are arranged inline in a radial direction, the distance between the holes and the horizontal pressing portions decreases, weakening the portion therebetween. Thus, it is preferable to make the distance therebetween as great as possible by alternately arranging the screw coupling holes 164 and the horizontal pressing portions 168.

Figure 7:
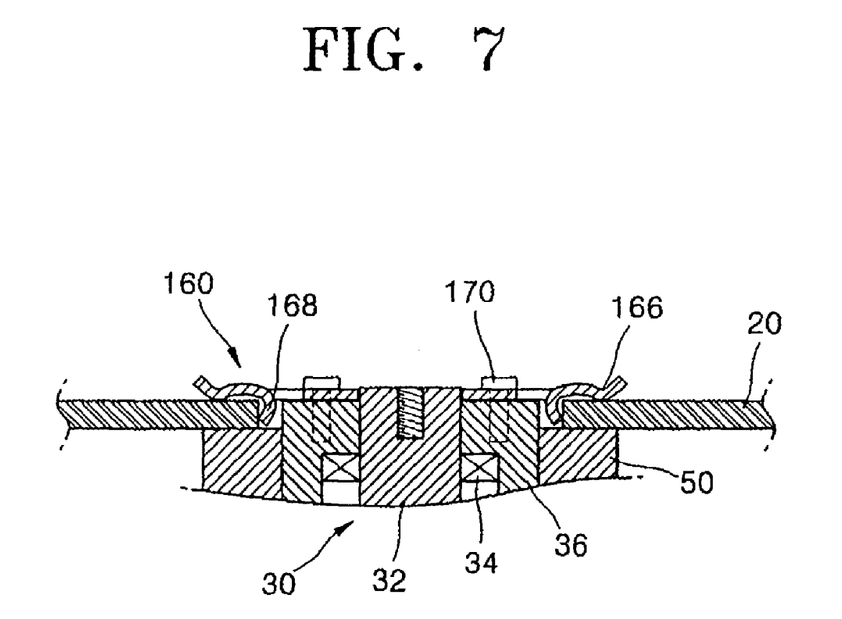
FIG. 7 is a sectional view of the disk clamp portion taken along the line B—B of FIG. 4, respectively, which shows a state after the screws are coupled to the spindle motor.

Also, the disk clamp 160, as shown in the embodiment of FIGS. 5 and 6, may have a dome shape, as a whole, in which the center portion thereof bulges upward. Before the screws 170 are coupled to the spindle motor 30, the vertical pressing portion 166 is simply placed on the upper surface of the disk 20 while the horizontal pressing portions 168 are loosely inserted between the outer circumference of the hub 36 of the spindle motor 30 and the inner circumference of the disk 20. However, as shown in FIG. 7, when the screws 170 are coupled to the spindle motor 30, as the center portion of the disk clamp 160 is pressed by the screws 170, the disk clamp 160 is deformed, as a whole, to a flat shape. Accordingly, by the above deformation of the disk clamp 160, the vertical pressing portion 166 presses the upper surface of the disk 20 downward and the horizontal pressing portions 168 are wide open outwardly to contact the inner circumferential surface of the disk 20 firmly and press the disk 20 in the horizontal direction. Accordingly, the disk 20 is firmly installed at the spindle motor 30 and is substantially immovable in the vertical and horizontal directions.

As described above, according to an embodiment of the present invention, when an external impact, in particular, an impact in the horizontal direction, is applied to the hard disk drive, the disk 20 can be prevented from moving in the horizontal direction, that is, a slip is prevented by the horizontal pressing portion 168, which may, in one embodiment, comprise a single circular portion that is concentric with the spindle motor 30 and the inner circumference of the disk 20. Thus, the damage to the spindle motor 30 caused as the disk 20 directly collides against the outer circumference of the spindle motor 30 due to the slip of the disk 20 is prevented.

The disk clamp 160 according to the embodiment of the present invention is manufactured of a metal material having a predetermined elasticity, for example, a stainless steel material. Thus, although the external impact applied to the disk 20 is delivered to the horizontal pressing portion 168 that is closely contacting the inner circumferential surface of the disk 20, the impact is reduced by the elasticity of the horizontal pressing portion 168. Also, conventionally, the force of an impact applied to the disk 20 is delivered by the slip of the disk 20 directly to the spindle motor 30. However, according to the present invention, since the impact is indirectly delivered to the spindle motor 30 via the disk clamp 160 having a predetermined elasticity and the screws 170, the impact is reduced in the course of the delivery so that the force of the impact finally delivered to the spindle motor 30 is far less than a force in the conventional art.

In the meantime, the spacer 50 is inserted around the outer circumference of the hub 36 of the spindle motor 30 because the spindle motor 30 is used to install a plurality of the disks 20. However, although it is not shown, when a spindle motor for installation of a single magnetic disk is used, instead of not using the spacer, a step for accommodating a magnetic disk can be formed at the outer circumference of the spindle motor. In this case, it is obvious that the disk clamp according to the present invention can be used.

As described above, according to an embodiment of the present invention, when an external impact is applied to the hard disk drive, a slip of the disk is prevented by the horizontal pressing portion, and the force of the impact delivered to the spindle motor is reduced so that the spindle motor is prevented from being damaged. Thus, data recording/reproducing capability and reliability are improved. Also, magnetic disk fluttering due to a damaged spindle motor and noise due to the magnetic disk fluttering are reduced.

Although a few embodiments of the present invention have been shown and described, it would be appreciated by those skilled in the art that changes may be made in this embodiment without departing from the principles and spirit o the invention, the scope of which is defined in the claims and their equivalents.

What is claimed is:

1. A disk clamp of a hard disk drive firmly installing a disk to store data using a spindle motor of the hard disk drive, the disk clamp comprising:
   a vertical pressing portion, located along an edge portion of the disk, to press an upper surface of the disk in a vertical direction;
   a plurality of linear horizontal pressing portions, substantially perpendicular to a plane of the disk, integrally formed with, and inside the circumference of, vertical pressing portion to protrude downward and be inserted between an outer circumference of a hub of the spindle motor and an inner circumference of the disk, to press an inner circumferential surface of the disk outwardly; and
   a plurality of screw coupling holes formed inside the linear horizontal pressing portions, through which screws are inserted to be coupled to an upper end portion of the hub of the spindle motor,
   wherein the vertical pressing portion has a dome shape in which a center portion of the vertical pressing portion bulges upward, and when being coupled to the hub of the spindle motor by a screw, the vertical pressing portion is deformed to a flat shape, has a section bulging downward, and is formed along an outer circumference of the disk clamp, pressing the upper surface of the disk.

2. The disk clamp as claimed in claim 1, wherein the linear horizontal pressing portion presses the inner circumferential surface of the disk by the deformation of the disk clamp.

3. The disk clamp as claimed in claim 1, wherein the linear horizontal pressing portions are formed in at least three positions in a circumferential direction at regular intervals.

4. The disk clamp as claimed in claim 3, wherein the linear horizontal pressing portions are formed at four positions at an interval of approximately 90° in the circumferential direction.

5. The disk clamp as claimed in claim 1, wherein the disk clamp comprising a metal material having a predetermined elasticity.

6. A disk clamp of a hard disk drive firmly installing a disk to store data using a spindle motor of the hard disk drive, the disk clamp comprising:
- a vertical pressing portion, formed along an outer circumference of the disk clamp, to press an upper surface of the disk in a vertical direction;
- a plurality of linear horizontal pressing portions, substantially perpendicular to a plane of the disk, integrally formed inside the vertical pressing portion to protrude downward and be inserted between an outer circumference of a hub of the spindle motor and an inner circumference of the disk, to press an inner circumferential surface of the disk outwardly; and
- a plurality of screw coupling holes formed inside the linear horizontal pressing portions, through which screws are inserted to be coupled to an upper end portion of the hub of the spindle motor,
- wherein the numbers of the linear horizontal pressing portions and the screw coupling holes are the same, and the linear horizontal pressing portions and the screw coupling holes each are formed at regular intervals in the circumferential direction, arranged alternately,
- wherein the vertical pressing portion has a dome shape in which a center portion of the vertical pressing portion bulges upward, and when being coupled to the hub of the spindle motor by a screw, the vertical pressing portion is deformed to a flat shape and has a section bulging downward and formed over an edge portion of the disk clamp.

7. A disk clamp of a hard disk drive having a disk, comprising:
- a reconfigurable concave vertical clamping portion, placed concentrically with the disk, having a concave surface proximate the disk and attachable to a hub of a spindle motor, wherein the reconfigurable concave vertical clamping portion bulges upward, and when being coupled to the hub of the spindle motor by a screw, the reconfigurable concave vertical clamping portion is deformed to a flat shape when coupled to the hub of the spindle motor, and wherein the reconfigurable concave vertical clamping portion has a section bulging downward and is formed along an outer circumference of the disk clamp, pressing the upper surface of the disk; and
- a linear horizontal stabilizing member, substantially perpendicular to a plane of the disk, integrally formed with, and located inside a circumference of, the reconfigurable concave vertical clamping portion, extending downward between an outer circumference of the hub of the spindle motor and an inner circumference of the disk, to press an inner circumferential surface of the disk outwardly.

8. The disk clamp as claimed in claim 7, wherein, when the reconfigurable concave vertical clamping portion is coupled to the hub of the spindle motor, the linear horizontal stabilizing member presses the inner circumferential surface of the disk.

9. The disk clamp as claimed in claim 8, wherein the linear horizontal stabilizing member comprises a plurality of projections that are formed in at least three positions in a circumferential direction at regular intervals.

10. The disk clamp as claimed in claim 9, wherein the linear horizontal stabilizing member comprises a plurality of projections that are formed at four positions at an interval of approximately 90° in the circumferential direction.

11. The disk clamp as claimed in claim 7, wherein the disk clamp comprises a metal material having a predetermined elasticity.

12. The disk clamp as claimed in claim 7, wherein the linear horizontal stabilizing member comprises a circular portion concentric with the hub of the spindle motor and the inner circumference of the disk.

13. A disk clamp of a hard disk drive having a disk, comprising:
- a reconfigurable concave vertical clamping portion, placed concentrically with the disk, having a concave surface proximate the disk and attachable to a hub of a spindle motor, wherein the reconfigurable concave vertical clamping portion has a section bulging downward and is formed along an outer circumference of the disk clamp, pressing the upper surface of the disk; and
- a linear horizontal stabilizing member, substantially perpendicular to a plane of the disk, integrally formed inside the reconfigurable concave vertical clamping portion, extending downward between an outer circumference of the hub of the spindle motor and an inner circumference of the disk, to press an inner circumferential surface of the disk outwardly,
- wherein the reconfigurable concave vertical clamping portion is flattened when coupled to the hub of the spindle motor,
- wherein, when the reconfigurable concave vertical clamping portion is coupled to the hub of the spindle motor, the linear horizontal stabilizing member presses the inner circumferential surface of the disk,
- wherein the linear horizontal stabilizing member comprises a plurality of projections that are formed at four positions at an interval of approximately 90° in the circumferential direction, and
- wherein numbers of the plurality of projections and screw coupling holes are the same, and the plurality of projections and the screw coupling holes each are formed at regular intervals in the circumferential direction and are arranged alternately.

14. A method of firmly installing a disk for storing data at a spindle motor of the hard disk drive, comprising:
- attaching, to a hub of a spindle motor, a disk clamp having a reconfigurable concave vertical clamping portion located concentric with a disk, wherein a concave surface is proximate the disk, wherein the reconfigurable concave vertical clamping portion has a center portion that bulges upward, and when being coupled to the hub of the spindle motor by a screw, the reconfigurable concave vertical clamping portion is deformed to a flat shape, has a section bulging downward, and is formed along an outer circumference of the disk clamp, pressing the upper surface of the disk; and
- placing a plurality of linear horizontal stabilizers, substantially perpendicular to a plane of the disk, integrally formed with, and located inside a circumference of, the reconfigurable concave vertical clamping portion, to extend downward between an outer circumference of the hub of the spindle motor and an inner circumference of the disk, to press an inner circumferential surface of the disk outwardly.

15. The method as claimed in claim 14, further including, when the reconfigurable concave vertical clamping portion is attached to the hub of the spindle motor, tightening the reconfigurable concave vertical clamping portion to the hub of the spindle motor until the reconfigurable concave vertical clamping portion is flat.

16. The method as claimed in claim 14, wherein the plurality of linear horizontal stabilizers presses the inner circumferential surface of the disk when the reconfigurable concave vertical clamping portion is flat.

17. A method of firmly installing a disk for storing data at a spindle motor of the hard disk drive, comprising:

attaching, to a hub of a spindle motor, a disk clamp having a reconfigurable concave vertical clamping portion concentric with a disk, wherein a concave surface is proximate the disk, wherein the reconfigurable concave vertical clamping portion has a section bulging downward and is formed along an outer circumference of the disk clamp, pressing the upper surface of the disk; and placing a plurality of linear horizontal stabilizers, substantially perpendicular to a plane of the disk, integrally formed inside the reconfigurable concave vertical clamping portion, to extend downward between an outer circumference of the hub of the spindle motor and an inner circumference of the disk, to press an inner circumferential surface of the disk outwardly, wherein, when the reconfigurable concave vertical clamping portion is attached to the hub of the spindle motor, tightening the reconfigurable concave vertical clamping portion to the hub of the spindle motor until the reconfigurable concave vertical clamping portion is flat, and wherein the tightening the reconfigurable concave vertical clamping portion to the hub of the spindle motor is accomplished by attaching the reconfigurable concave vertical clamping portion to the hub of the spindle motor with screws inserted through screw holes arranged alternately and, at regular intervals with, the linear horizontal stabilizers.

* * * * *

UNITED STATES PATENT AND TRADEMARK OFFICE
CERTIFICATE OF CORRECTION

PATENT NO. : 7,158,343 B2  Page 1 of 1
APPLICATION NO. : 10/358890
DATED : January 2, 2007
INVENTOR(S) : Do-wan Kim It is certified that error appears in the above-identified patent and that said Letters Patent is hereby corrected as shown below:

Column 6, Line 35, change "the" to --a--.

Column 6, Line 35, after "of", insert --the--.

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,158,343 B2 Page 1 of 1
APPLICATION NO. : 10/358890
DATED : January 2, 2007
INVENTOR(S) : Do-wan Kim It is certified that error appears in the above-identified patent and that said Letters Patent is hereby corrected as shown below:

Column 6, Line 35, change "the" to --a--.

Column 6, Line 35, after "of," insert --the--.

This certificate supersedes Certificate of Correction issued April 3, 2007.

Signed and Sealed this

Seventh Day of August, 2007

JON W. DUDAS
*Director of the United States Patent and Trademark Office*